(12) United States Patent
Oda

(10) Patent No.: US 10,534,090 B2
(45) Date of Patent: Jan. 14, 2020

(54) PROCESS BUS-APPLIED PROTECTION SYSTEM

(71) Applicant: MITSUBISHI ELECTRIC CORPORATION, Chiyoda-ku, Tokyo (JP)

(72) Inventor: Shigetoo Oda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 259 days.

(21) Appl. No.: 15/543,771

(22) PCT Filed: Mar. 19, 2015

(86) PCT No.: PCT/JP2015/058214
§ 371 (c)(1),
(2) Date: Jul. 14, 2017

(87) PCT Pub. No.: WO2016/147375
PCT Pub. Date: Sep. 22, 2016

(65) Prior Publication Data
US 2017/0371041 A1    Dec. 28, 2017

(51) Int. Cl.
*G01S 19/37*  (2010.01)
*G01S 19/23*  (2010.01)

(52) U.S. Cl.
CPC .............. *G01S 19/37* (2013.01); *G01S 19/23* (2013.01)

(58) Field of Classification Search
CPC ............ H02H 7/263; H02H 7/28; H02H 3/08; H02H 3/24; H02J 13/0079; G01S 19/23;
(Continued)

(56) References Cited

U.S. PATENT DOCUMENTS

2002/0116092 A1    8/2002   Hamamatsu et al.
2011/0161468 A1*   6/2011   Tuckey ............... H04L 41/0803
                                                                  709/220
(Continued)

FOREIGN PATENT DOCUMENTS

JP    63-124711 A    5/1988
JP    2000-078740 A  3/2000
(Continued)

OTHER PUBLICATIONS

International Search Report (PCT/ISA/210) dated May 26, 2015, by the Japanese Patent Office as the International Searching Authority for International Application No. PCT/JP2015/058214.
(Continued)

*Primary Examiner* — Brian D Nguyen
(74) *Attorney, Agent, or Firm* — Buchanan Ingersoll & Rooney PC

(57) ABSTRACT

A process bus-applied protection system includes a process bus, a plurality of MUs (merging units), and a plurality of IEDs (intelligent electric devices). Each of the MUs is configured to sample a current and a voltage of a power system at timing synchronized with a time synchronization signal received through the process bus. Each of the IEDs is configured to be capable of outputting the time synchronization signal to the process bus by serving as a transmission source, and receiving, through the process bus, the time synchronization signal from another IED. The plurality of IEDs have a predetermined priority. Each of the IEDs is configured, when the IED does not receive the time synchronization signal from an IED having a higher priority than that of the IED and serving as a transmission source, to output the time synchronization signal to the process bus by serving as a transmission source.

9 Claims, 10 Drawing Sheets

(58) Field of Classification Search
CPC ... G01S 19/37; Y02B 70/3266; Y04S 20/242; Y04S 10/18; Y02E 60/724
See application file for complete search history.

(56) References Cited

U.S. PATENT DOCUMENTS

| | | | |
|---|---|---|---|
| 2012/0078555 A1* | 3/2012 | Banhegyesi | G01D 4/004 702/64 |
| 2012/0187770 A1* | 7/2012 | Slota | H02J 3/42 307/87 |
| 2013/0157593 A1 | 6/2013 | Achanta | |
| 2013/0204554 A1* | 8/2013 | Tuckey | G01R 19/2513 702/58 |
| 2013/0329768 A1* | 12/2013 | Kagan | G01R 22/063 375/133 |
| 2014/0058689 A1* | 2/2014 | Klien | H04L 63/14 702/60 |
| 2014/0074415 A1* | 3/2014 | Rudolph | G01R 21/133 702/60 |
| 2014/0100801 A1* | 4/2014 | Banhegyesi | G01D 4/004 702/61 |
| 2014/0136002 A1* | 5/2014 | Gopalakrishnan | H04Q 9/00 700/286 |
| 2014/0270027 A1 | 9/2014 | Oda | |
| 2014/0344559 A1 | 11/2014 | Morita et al. | |
| 2015/0333495 A1 | 11/2015 | Kawarada et al. | |

FOREIGN PATENT DOCUMENTS

| | | |
|---|---|---|
| JP | 2002-315233 A | 10/2002 |
| JP | 2013-164731 A | 8/2013 |
| JP | 2015-023742 A | 2/2015 |
| WO | WO 2013/054423 A1 | 4/2013 |
| WO | WO 2014/112264 A1 | 7/2014 |

OTHER PUBLICATIONS

Written Opinion (PCT/ISA/237) dated May 26, 2015, by the Japanese Patent Office as the International Searching Authority for International Application No. PCT/JP2015/058214.
IEC 62439-3 standard specification, Edition 2.0, Jul. 2012.
IEEE 1588 standard specification (IEEE Standard for a Precision Clock Synchronization Protocol for Networked Measurement and Control Systems), Approved on Mar. 27, 2008.

* cited by examiner

FIG.5

| TIME SYNCHRONIZATION SIGNAL A HAVING HIGHER PRIORITY THAN ITS OWN IED | TIMING SIGNAL B FROM GPS RECEIVER | TIME SYNCHRONIZATION SIGNAL D HAVING LOWER PRIORITY THAN ITS OWN IED | SIGNAL USED TO READ SV DATA | TIME SYNCHRONIZATION SIGNAL TO BE OUTPUT TO PROCESS BUS |
|---|---|---|---|---|
| RECEIVED | RECEIVED | RECEIVED/NOT RECEIVED | A | NOT OUTPUT |
| RECEIVED | NOT RECEIVED | RECEIVED/NOT RECEIVED | A | NOT OUTPUT |
| NOT RECEIVED | RECEIVED | RECEIVED/NOT RECEIVED | B | SIGNAL SYNCHRONIZED WITH B |
| NOT RECEIVED | NOT RECEIVED | RECEIVED | D | NOT OUTPUT |

FIG.9

| TIME SYNCHRONIZATION SIGNAL A1 HAVING HIGH PRIORITY BASED ON GPS | TIME SYNCHRONIZATION SIGNAL A2 HAVING HIGH PRIORITY NOT BASED ON GPS | TIMING SIGNAL B FROM GPS RECEIVER | TIME SYNCHRONIZATION SIGNAL D HAVING LOW PRIORITY BASED ON GPS | SIGNAL USED TO READ SV DATA | TIME SYNCHRONIZATION SIGNAL TO BE OUTPUT TO PROCESS BUS |
|---|---|---|---|---|---|
| RECEIVED | NOT RECEIVED | RECEIVED | RECEIVED/NOT RECEIVED | A1 | NOT OUTPUT |
| RECEIVED | NOT RECEIVED | NOT RECEIVED | RECEIVED/NOT RECEIVED | A1 | NOT OUTPUT |
| NOT RECEIVED | RECEIVED (→ NOT RECEIVED) (NOTE BELOW) | RECEIVED | RECEIVED/NOT RECEIVED | B | SYNCHRONIZED WITH B |
| NOT RECEIVED | RECEIVED (→ NOT RECEIVED) (NOTE BELOW) | NOT RECEIVED | RECEIVED | D | NOT OUTPUT |
| NOT RECEIVED | RECEIVED | NOT RECEIVED | NOT RECEIVED | A2 | NOT OUTPUT |
| NOT RECEIVED | NOT RECEIVED | RECEIVED | RECEIVED/NOT RECEIVED | B | SYNCHRONIZED WITH B |
| NOT RECEIVED | NOT RECEIVED | NOT RECEIVED | RECEIVED | D | NOT OUTPUT |
| NOT RECEIVED | NOT RECEIVED | NOT RECEIVED | NOT RECEIVED | TIMING SIGNAL C BASED ON INTERNAL CLOCK | SYNCHRONIZED WITH C |

(NOTE) WHEN THE TIME SYNCHRONIZATION SIGNAL (SYNCHRONIZED WITH B, OR D) BASED ON THE GPS IS RECEIVED ON THE PROCESS BUS, THE IED HAVING A HIGH PRIORITY STOPS TRANSMITTING SIGNAL A2.

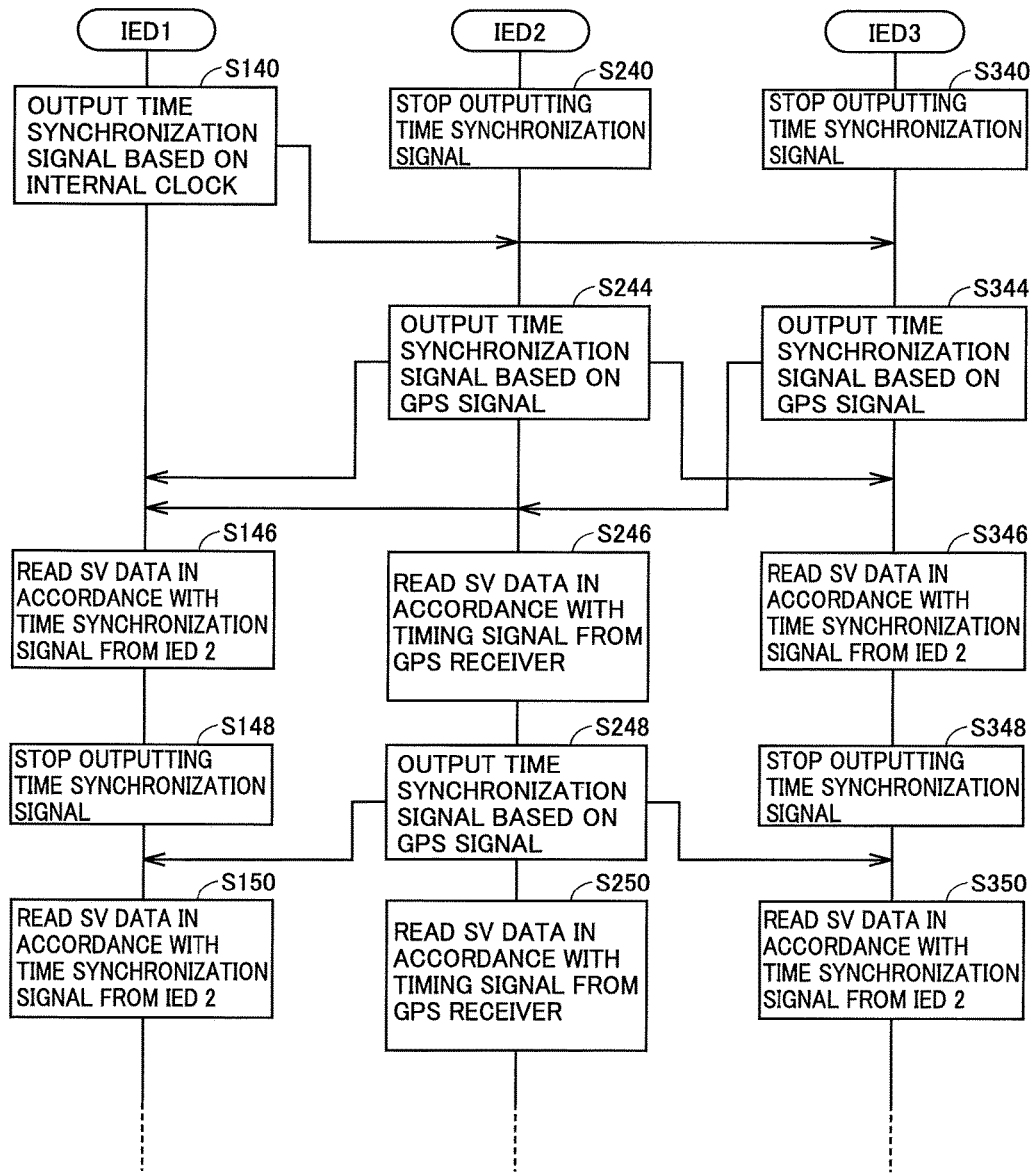

PROCESS BUS-APPLIED PROTECTION SYSTEM

TECHNICAL FIELD

The present invention relates to a system of protecting a power system to which a process bus is applied (process bus-applied protection system), and particularly relates to a time synchronization method in such a process bus-applied protection system.

BACKGROUND ART

A conventional power transforming device protection and control system to which a process bus is applied includes voltage/current detection means called a merging unit (MU) or a sensor unit, and protection and control means called an IED (intelligent electronic device). These merging unit and IED are interconnected via a communication network called a process bus. Furthermore, the IED is coupled to a higher control computer terminal via a communication network called a station bus.

In recent years, it has been proposed to duplicate these process bus and station bus (more generally, to make them redundant) to improve reliability (see the IEC 62439-3 standard specification (NPD 1), for example). Japanese Patent Laying-Open No. 2002-315233 (PTD 1) discloses duplication of transmission paths.

CITATION LIST

Patent Document

PTD 1: Japanese Patent Laying-Open No. 2002-315233

Non Patent Documents

NPD 1: IEC 62439-3 standard specification, Edition 2.0, 2012-07
NPD 2: IEEE 1588 standard specification (IEEE Standard for a Precision Clock Synchronization Protocol for Networked Measurement and Control Systems), Approved on Mar. 27, 2008

SUMMARY OF INVENTION

Technical Problem

In an IED that performs a protection element calculation using current and voltage signals output from a plurality of merging units, all the current and voltage signals input through a process bus need to be data sampled at the same timing. For this purpose, each merging unit usually samples a current and a voltage based on a time synchronization signal transmitted from the IED. Alternatively, each merging unit synchronizes the timing of sampling the current and voltage with a time synchronization signal output from a GPS (Global Positioning System) signal receiver.

In the latter case, if the GPS signal is lost for some reason, sampling synchronization among the plurality of merging units is lost, creating availability issues. On the other hand, in the former case, that is, in a method of achieving sampling synchronization among the plurality of merging units based on the time synchronization signal from the IED, even if a timing signal from a GPS signal receiver received by the IED is lost, the IED can generate a time synchronization signal using an internal clock. Thus, availability issues are not created.

However, another issue is created when a process bus is applied to a protection system consisting of a plurality of IEDs. In this case, since time synchronization signals from the plurality of IEDs flow onto the process bus, and furthermore, the time synchronization signal transmitted from each IED is generated based on a GPS signal, the time synchronization signals from the plurality of IEDs are transmitted onto the process bus at almost the same timing. As a result, traffic on a transmission path increases, which may result in failure to transmit the important current data and voltage data within a specified control period. Alternatively, a need arises to increase a transmission rate of the transmission path in order to avoid this failure, which may contribute to an increased cost.

Furthermore, in the case in which a merging unit receives a plurality of time synchronization signals from a plurality of IEDs, it is required to determine, based on which time synchronization signal, a timing signal for sampling should be generated. Particularly, in a system where a plurality of merging units are connected to a process bus, all the merging units need to select the same time synchronization signal. For this purpose, it is required to predetermine which IED sends the time synchronization signal with which the sampling is to be synchronized.

The present invention was made in view of the problems described above. An object of the present invention is to provide, in a system where a plurality of IEDs and a plurality of MUs are interconnected via a process bus, a protection system capable of implementing highly accurate time synchronization among the MUs without placing an excessive load on a transmission path.

Solution to Problem

The present invention is directed to a process bus-applied protection system including a process bus, a plurality of MUs (merging units), and a plurality of IEDs (intelligent electronic devices). Each of the MUs is configured to sample a current and a voltage of a power system at timing synchronized with a time synchronization signal received through the process bus. Each of the IEDs is configured to be able to output the time synchronization signal to the process bus by serving as a transmission source. Each of the IEDs is also capable of receiving, through the process bus, the time synchronization signal from another IED serving as a transmission source. The plurality of IEDs have a predetermined priority. Each of the IEDs is configured, when the IED does not receive the time synchronization signal from an IED having a higher priority than that of the IED and serving as a transmission source, to output the time synchronization signal to the process bus by serving as a transmission source.

Advantageous Effects of Invention

According to the present invention, under normal conditions, an IED having the highest priority serves as a transmission source of the time synchronization signal. When the IED having the highest priority can no longer transmit the time synchronization signal for some reason, the transmission source of the time synchronization signal is automatically switched to an IED having the next highest priority. Accordingly, only a single time synchronization signal is output to the process bus, so that highly accurate time synchronization among the MUs can be implemented based on this single time synchronization signal, without an excessive increase in traffic on the process bus.

BRIEF DESCRIPTION OF DRAWINGS

FIG. 5 is a diagram showing in table form the operation of a time synchronization control circuit 23 shown in FIG. 4.

FIG. 9 is a diagram showing in table form the operation of a time synchronization control circuit 23A shown in FIG. 8.

FIG. 10 is a flowchart showing an operation example of the case in which IED 1 can no longer receive a GPS signal, in the operation example of FIG. 6.

DESCRIPTION OF EMBODIMENTS

Figure 1:
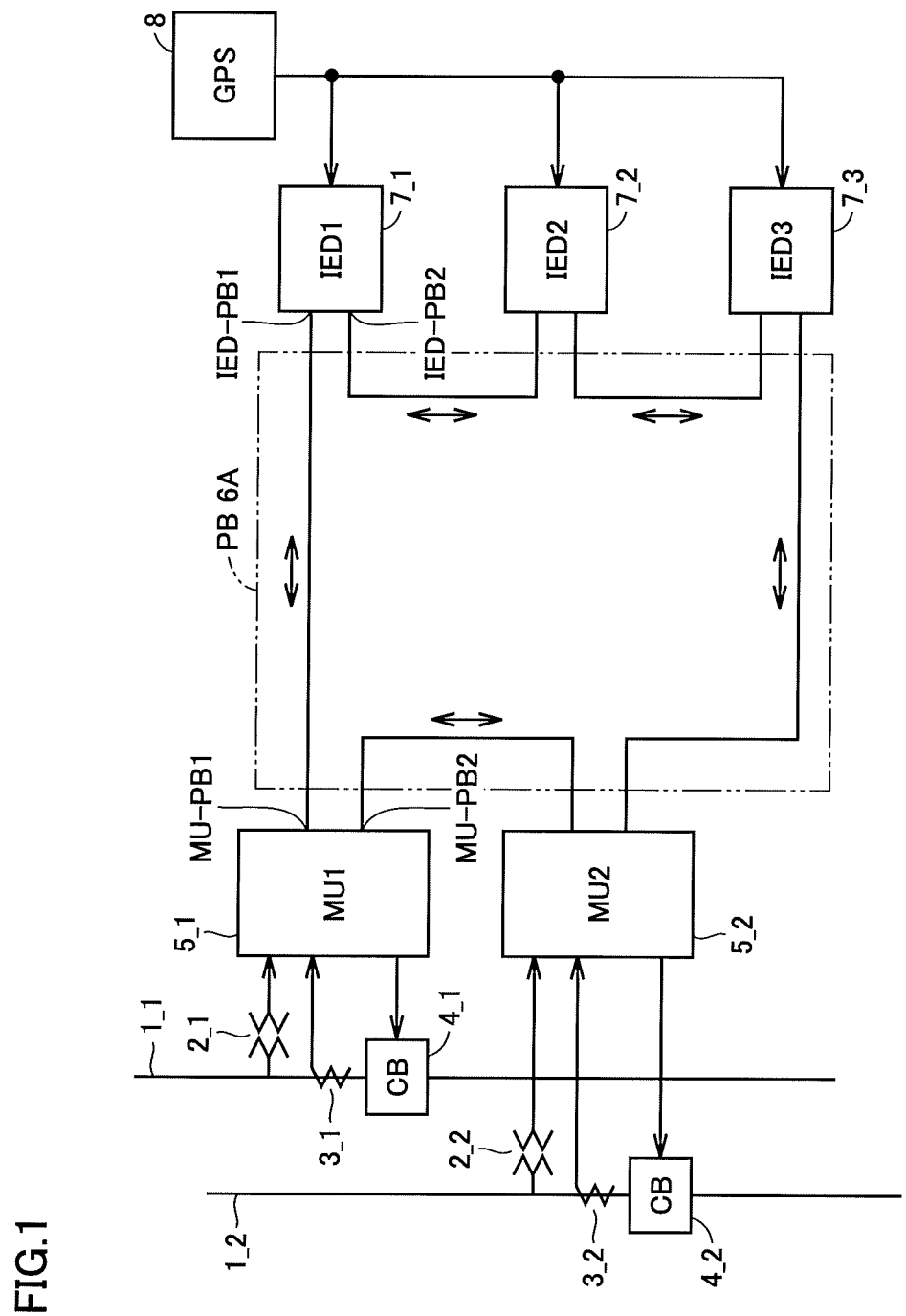
FIG. 1 is a block diagram showing a configuration example of a protection system to which a redundant process bus is applied.

Each embodiment will be described below in detail with reference to the drawings. It is noted that the same reference characters are allotted to the same or corresponding parts, and the description thereof will not be repeated.

<First Embodiment>
[Overall Configuration of Protection System]

FIG. 1 is a block diagram showing a configuration example of a protection system to which a redundant process bus is applied. The protection system shown in FIG. 1 has a protecting and controlling function of detecting a failure in a power system and isolating the failure portion from the power system, based on input of current information and/or voltage information on the power system (note that "and/or" means "at least one of"). The protection system includes a plurality of merging units (in the example of FIG. 1, two MU 1 (5_1) and MU 2 (5_2) are representatively shown), and a plurality of IEDs (in the example of FIG. 1, three IED 1 (7_1), IED 2 (7_2), and IED 3 (7_3) are representatively shown). These MUs and IEDs are interconnected via a process bus (PB) 6A.

MU 1 (5_1) acquires information about a voltage of a line 1_1 such as a power transmission line by an instrument voltage transformer (also called a voltage transformer) 2_1, and acquires information about a current flowing through line 1_1 by an instrument current transformer (also called a current transformer) 3_1. Only one of the voltage information and the current information may be acquired, or a plurality of pieces of voltage information and a plurality of pieces of current information may be acquired. Similarly, MU 2 (5_2) acquires information about a voltage of a line 1_2 by an instrument voltage transformer (also called a voltage transformer) 2_2, and acquires information about a current flowing through line 1_2 by an instrument current transformer (also called a current transformer) 3_2.

Each of MU 1 (5_1) and MU 2 (5_2) converts the input current data into digital data in a prescribed sampling cycle (4800 Hz, for example) specified by the process bus, and outputs the converted digital data to process bus 6A. In the following, the converted digital data will be referred to as SV (sampled value) data.

Each of IED 1 (7_1), IED 2 (7_2), and IED 3 (7_3) performs a protection and control calculation using the SV data about the current and/or voltage acquired from MU 1 (5_1) and MU 2 (5_2). When each IED determines that there is a failure in the power system as a result of the protection and control calculation, it outputs an operation signal to process bus 6A. When each of MU 1 (5_1) and MU 1 (5_2) receives this operation signal, it outputs an open command to a corresponding one of circuit breakers (CB) 4_1 and 4_2.

In addition, each of IED 1 (7_1), IED 2 (7_2), and IED 3 (7_3) receives a timing signal for time synchronization from a GPS signal receiver 8. GPS signal receiver 8 generates the timing signal to be distributed to each IED based on a GPS signal received from a satellite. Each IED transmits a time synchronization signal synchronized with the timing signal from the GPS signal receiver to each device connected to process bus 6B. Although FIG. 1 shows an example in which all IEDs are connected to common GPS signal receiver 8, each IED may be connected to a different GPS signal receiver.

Process bus 6A is made redundant in order to ensure reliability. As used herein, redundancy means providing a plurality of communication paths between devices. A method for redundancy is not particularly limited. By way of example, FIG. 1 shows an example of a process bus that is duplicated in accordance with the High Availability Seamless Redundancy (HSR) standard as defined in IEC 62439-3.

Specifically, in the HSR standard, each MU has two input/output ports MU-PB1 and MU-PB2, and each IED has two input/output ports IED-PB1 and IED-PB2. The respective IEDs and MUs are connected in a ring via a bidirectional optical cable. For example, MU 1 (5_1) outputs the SV data through the MU-PB1 port to process bus 6A. MU 1 (5_1) also outputs the same SV data through the MU-PB2 port to process bus 6A. That is, the SV data from MU 1 (5_1) is transmitted from the MU-PB1 port successively through IED 1, IED 2, IED 3 and MU 2, while being transmitted from the MU-PB2 port successively through MU 2, IED 3, IED 2 and IED 1. Each device employs a system of acquiring data on a first-come, first-served basis, if the data is required in the device. The later received data is discarded. The earliest received data is used for processing in each device.

In the duplicated system as described above, if the transmission path between MU 1 and IED 1 is interrupted for some reason, for example, the SV data from MU 1 is transmitted to IED 1 through the path of MU 2, IED 3, IED 2 and IED 1. Accordingly, IED 1 can normally receive the SV data from MU 1, and the protection of the power system can be maintained.

Figure 2:
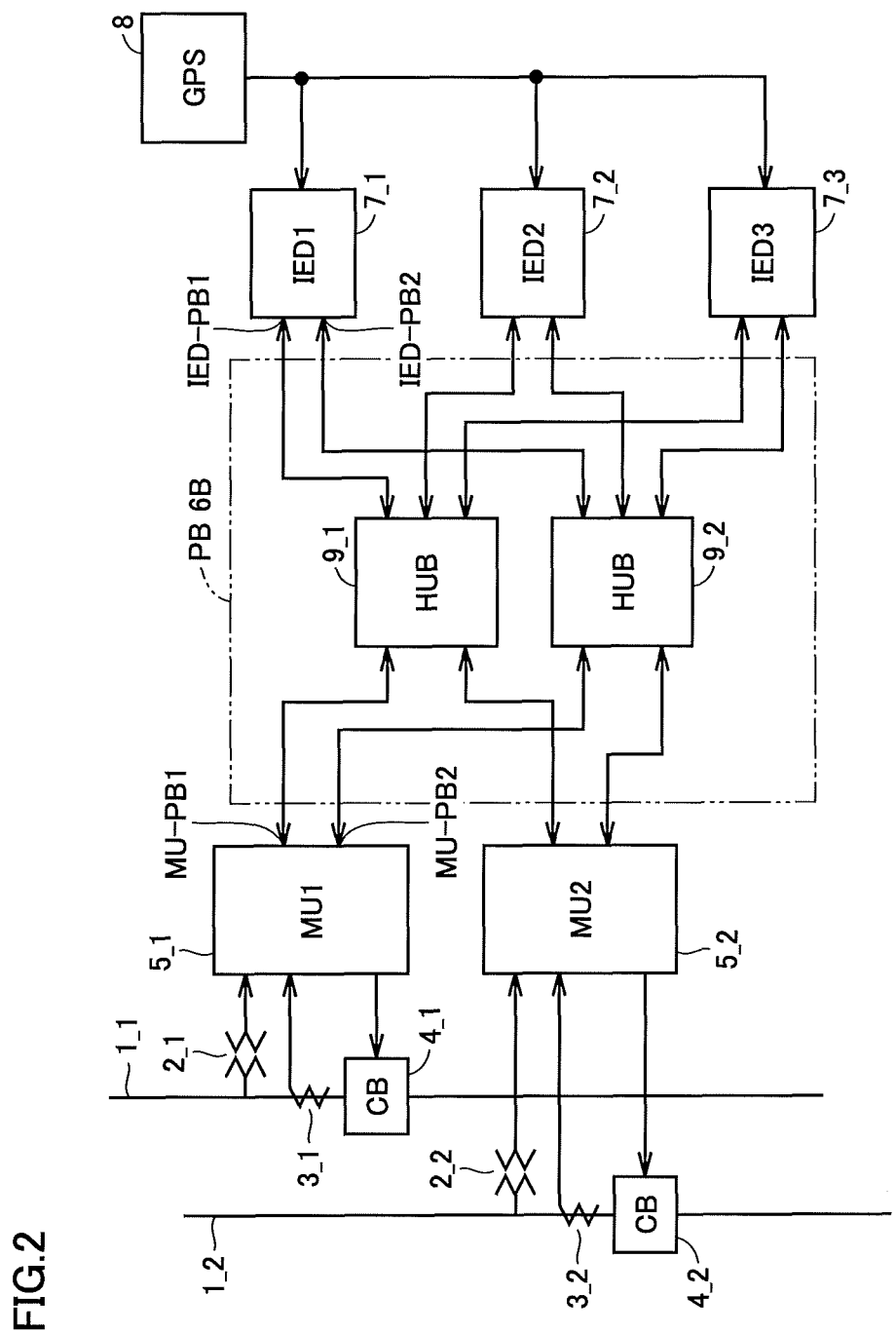
FIG. 2 is a block diagram showing another configuration example of a protection system to which a redundant process bus is applied.

FIG. 2 is a block diagram showing another configuration example of a protection system to which a redundant process bus is applied. FIG. 2 shows an example of a process bus that is duplicated in accordance with the Parallel Redundancy Protocol (PRP) standard as defined in IEC 62439-3.

Specifically, in the PRP standard, a process bus 6B includes hubs (HUBs) 9_1 and 9_2. The IED-PB1 port of each IED is connected through hub 9_1 to the IED-PB 1 ports of the other IEDs and the MU-PB1 port of each MU. The MU-PB1 port of each MU is connected through hub 9_1 to the MU-PB1 port of the other MU and the IED-PB1 port of each IED. Similarly, the IED-PB2 port of each IED is connected through hub 9_2 to the IED-PB2 ports of the other IEDs and the MU-PB2 port of each MU. The MU-PB2 port of each MU is connected through hub 9_2 to the MU-PB2 port of the other MU and the IED-PB2 port of each IED.

Each MU outputs the same SV data to hubs 9_1 and 9_2 through the MU-PB1 port and the MU-PB2 port, respectively. The SV data is output to each IED through hubs 9_1 and 9_2. Similarly, each IED outputs the same operation signal (circuit breaker open command), time synchronization signal and the like to hubs 9_1 and 9_2 through the IED-PB1 port and the IED-PB2 port, respectively. The operation signal (circuit breaker open command) is output to each MU through hubs 9_1 and 9_2. The time synchronization signal is output to the other IEDs and each MU through hubs 9_1 and 9_2.

In the duplicated system shown in FIG. 2, if the transmission path through hub 9_1 is interrupted for some reason, for example, the devices can communicate with each other by the transmission path through hub 9_2. As a result, each IED can normally receive the SV data from each MU, and the protection of the power system can be maintained. Since FIG. 2 is otherwise similar to FIG. 1, the same reference characters are allotted to the same or corresponding parts and the description will not be repeated. It is noted that the following mainly describes an example in which the HSR standard shown in FIG. 1 is employed, but an example in which the PRP standard is employed is almost the same.

[Configuration and Operation of MU]

Figure 3:
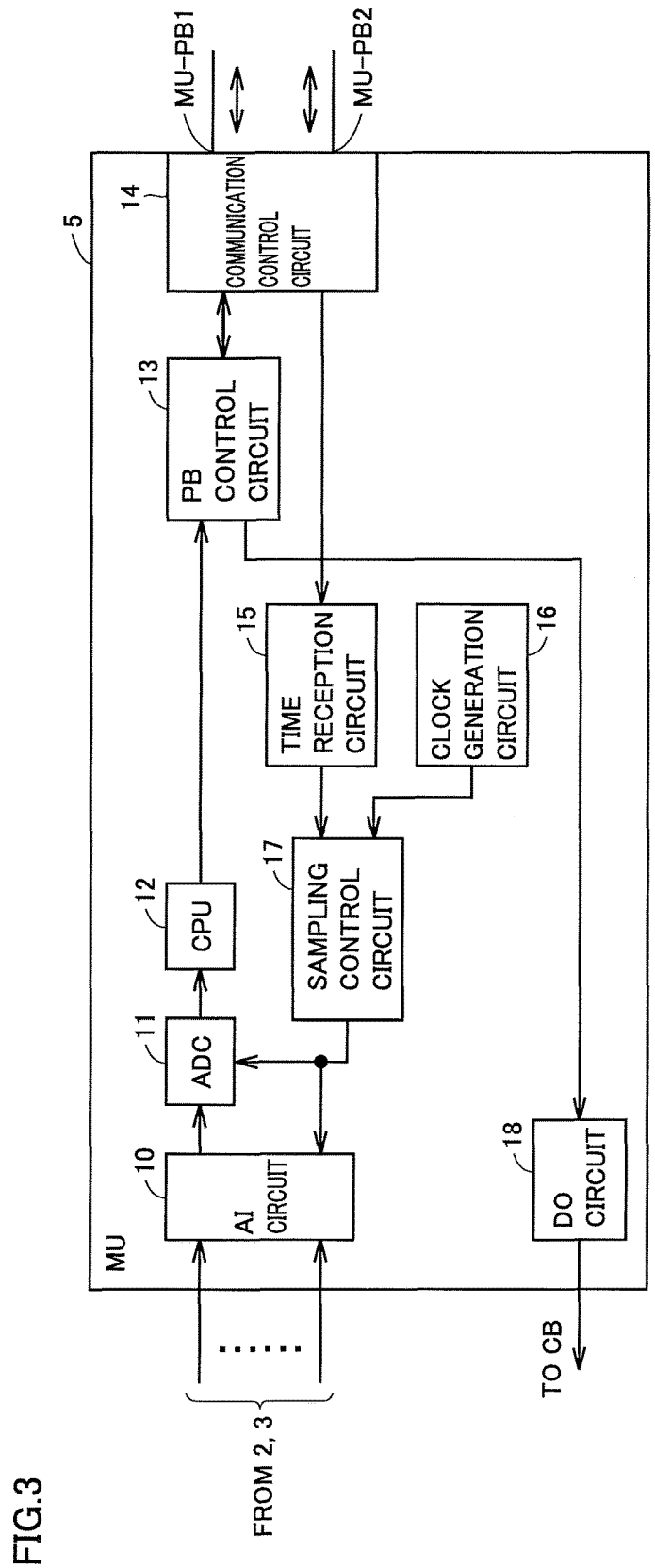
FIG. 3 is a block diagram showing the configuration of each merging unit 5 shown in FIGS. 1 and 2.

FIG. 3 is a block diagram showing the configuration of each merging unit 5 shown in FIGS. 1 and 2. Referring to FIG. 3, each MU 5 includes an analog input (AI) circuit 10, an analog-to-digital converter (ADC) 11, and a central processing unit (CPU) 12. Each MU 5 further includes a process buss (PB) control circuit 13, a communication control circuit 14, a time reception circuit 15, a clock generation circuit 16, a sampling control circuit 17, and a digital output (DO) circuit 18.

AI circuit 10 receives input of a voltage signal and/or current signal from voltage transformer 2 and/or current transformer 3. AI circuit 10 insulates voltage transformer 2 and current transformer 3 from the internal circuits of merging unit 5, and converts the input voltage signal and/or current signal into a signal of a level appropriate for processing in the internal circuits. To implement this function, AI circuit 10 is provided with a transformer, for example. AI circuit 10 further includes a filter and the like for removing a high-frequency noise component superimposed on the voltage signal and/or current signal.

AD converter 11 converts the voltage signal and/or current signal that has been input from AI circuit 10 into digital data. CPU 12 performs data processing, which is specified by the standard of the process bus, on the SV data that has been input from AD converter 11. PB control circuit 13 converts the data processed by CPU 12 into data that complies with a transmission procedure of the process bus, and outputs the data to communication control circuit 14.

Communication control circuit 14 performs control for the above-described communication duplication. Specifically, communication control circuit 14 outputs the data that has been input from PB control circuit 13 through each of input/output ports MU-PB1 and MU-PB2. Communication control circuit 14 captures data therein that is required for the MU provided therewith (its own MU), among the data that has been input from process bus 6 (6A and 6B) through input/output ports MU-PB1 and MU-PB2. When the same data is received, only the earlier received data is captured therein, and the later received data is discarded. In addition, in the case of the HSR standard shown in FIG. 1, communication control circuit 14 outputs data, that has been input from process bus 6 through one of input/output ports MU-PB1 and MU-PB2, to process bus 6 without change through the other port.

Time reception circuit 15 receives the time synchronization signal that has been input from process bus 6 through input/output ports MU-PB1 and MU-PB2. The received time synchronization signal is input to sampling control circuit 17 along with a clock signal generated at clock generation circuit 16.

When sampling control circuit 17 is normally receiving the time synchronization signal, it generates a timing signal for sampling based on the time synchronization signal, and when sampling control circuit 17 is not normally receiving the time synchronization signal, it generates a timing signal for sampling based on the clock signal. The generated timing signal is input to AI circuit 10 and AD converter 11.

When the operation signal (circuit breaker open command) transmitted from IED 1 or IED 2 is input to input/output ports MU-PB1 and MU-PB2, that operation signal is converted by PB control circuit 13 from a data format specified by the standard of the process bus into a data format suitable for internal processing. The converted operation signal is converted into a contact signal by DO circuit 18, and output as an open command to a prescribed circuit breaker.

It is noted that PB control circuit 13, communication control circuit 14, time reception circuit 15, and sampling control circuit 17 described above can be configured using an FPGA (Field Programmable Gate Array), for example. The function of PB control circuit 13 may be implemented by CPU 12.

[Configuration and Operation of IED]

Figure 4:
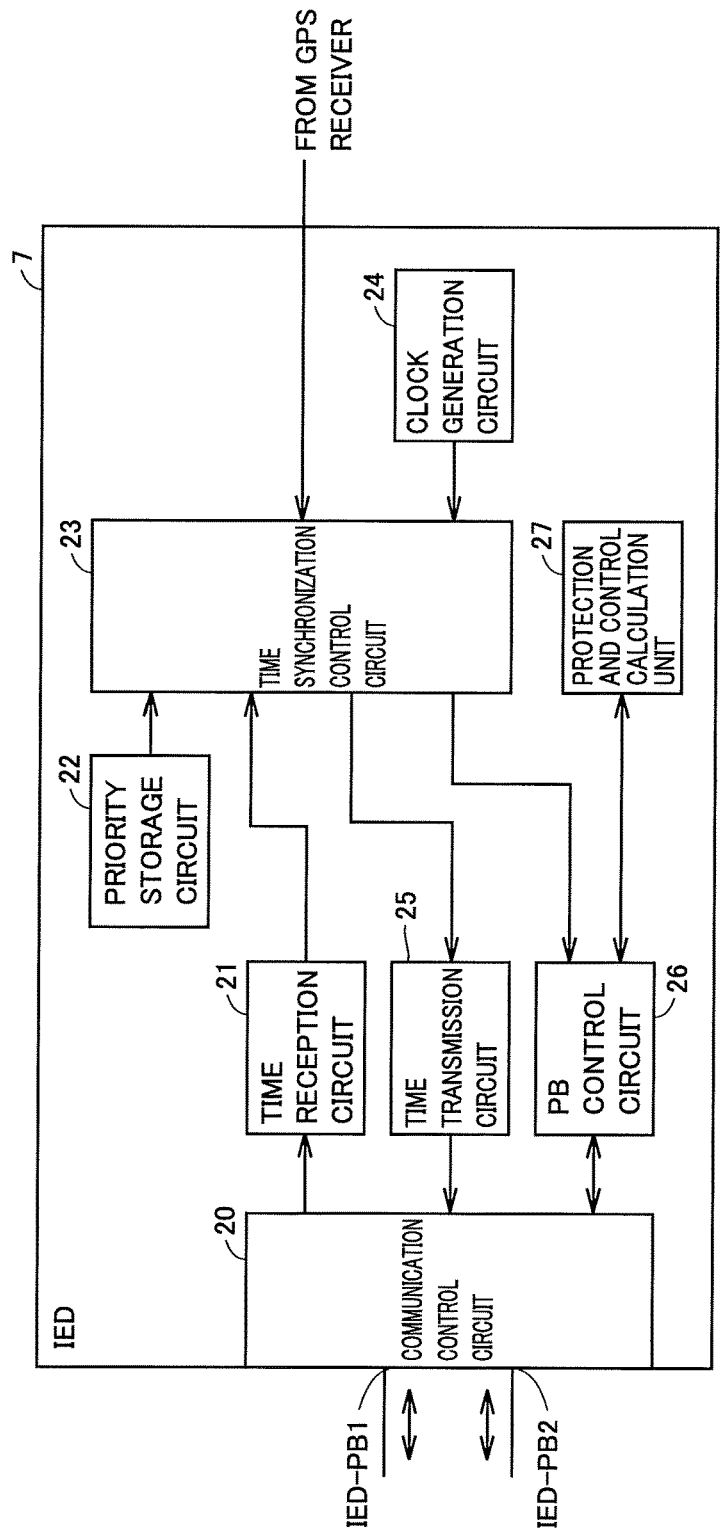
FIG. 4 is a block diagram showing the configuration of an IED 7 shown in FIGS. 1 and 2.

FIG. 4 is a block diagram showing the configuration of IED 7 shown in FIGS. 1 and 2. Referring to FIG. 4, each IED 7 includes a communication control circuit 20, a time reception circuit 21, a time transmission circuit 25, a PB control circuit 26, a priority storage circuit 22, a time synchronization control circuit 23, a clock generation circuit 24, and a protection and control calculation unit 27.

Communication control circuit 20 performs control required for the duplication of process bus 6 (6A or 6B), similarly to communication control circuit 14 of the MU. Specifically, communication control circuit 20 outputs the time synchronization signal that has been input from time transmission circuit 25, the circuit breaker open command that has been input from PB control circuit 26, and the like to process bus 6 through each of input/output ports IED-PB1 and IED-PB2. Communication control circuit 20 captures data therein that is required for the IED provided therewith (its own IED), among the data that has been input from process bus 6 through input/output ports IED-PB1 and IED-PB2. When the same data is received, only the earlier received data is captured therein, and the later received data is discarded. In addition, in the case of the HSR standard shown in FIG. 1, communication control circuit 20 outputs data, that has been input from process bus 6 through one of input/output ports IED-PB1 and IED-PB2, to process bus 6 without change through the other port.

When the SV data from each MU is input through input/output ports IED-PB1 and IED-PB2, PB control circuit 26 converts the received SV data into data suitable for an operation within the IED, at timing synchronized with an SV data reading timing signal received from time synchronization control circuit 23. The converted data is captured into protection and control calculation unit 27 which then performs a protection and control calculation on the data. When protection and control calculation unit 27 determines that there is a failure in the power system as a result of the protection and control calculation, it outputs the operation signal to PB control circuit 26. PB control circuit 26 outputs this operation signal as a circuit breaker open/close command through communication control circuit 20 to process bus 6 in accordance with a procedure specified by the standard of the process bus.

Time reception circuit 21 receives the time synchronization signal that has been input from process bus 6 through input/output ports IED-PB1 and IED-PB2. Time reception circuit 21 outputs the received time synchronization signal to time synchronization control circuit 23.

Priority storage circuit 22 stores the priority of the time synchronization signal from its own IED. The plurality of IEDs connected to process bus 6 have a predetermined priority of the time synchronization signals. A set value of the priority is read by time synchronization control circuit 23. It is noted that the time synchronization signal that has been input from process bus 6 also includes information about the priority. Although it was stated that the priority of the time synchronization signal generated by each IED is predetermined, this is substantially the same as the case in which the priority of each IED is predetermined.

Time synchronization control circuit 23 receives the time synchronization signal from time reception circuit 21, the timing signal from GPS signal receiver 8, and the clock signal from clock generation circuit 24. When the time synchronization signal received from process bus 6 (that is, the time synchronization signal from time reception circuit 21) has a higher priority than that of the time synchronization signal from its own IED, time synchronization control circuit 23 handles the time synchronization signal received from the process bus as the highest priority. Specifically, time synchronization control circuit 23 generates the SV data reading timing signal such that it is synchronized with the time synchronization signal received from process bus 6, and outputs the signal to PB control circuit 26.

The reason that the SV data reading timing signal is synchronized with the time synchronization signal received from process bus 6 is because each MU samples a voltage and/or a current of the power system at timing synchronized with that time synchronization signal. Accordingly, in order to read the SV data completely, the timing of reading the SV data needs to be synchronized with the timing of sampling by the MU.

On the other hand, when the time synchronization signal received from process bus 6 has a lower priority than that of the time synchronization signal from its own IED, or when the time synchronization signal is not received from process bus 6, time synchronization control circuit 23 handles the timing signal received from GPS signal receiver 8 as the highest priority. Specifically, time synchronization control circuit 23 generates the SV data reading timing signal such that it is synchronized with the timing signal received from GPS signal receiver 8, and outputs the signal to PB control circuit 26. Time synchronization control circuit 23 also outputs a time synchronization signal (which includes information about the priority of its own IED) synchronized with the timing signal received from GPS signal receiver 8 to time transmission circuit 25. This time synchronization signal is output by time transmission circuit 25 to process bus 6 through communication control circuit 20.

When the time synchronization signal received from process bus 6 has a lower priority than that of the time synchronization signal from its own IED, and also when the timing signal is not received from GPS signal receiver 8, time synchronization control circuit 23 generates the SV data reading timing signal based on a clock signal from the received time synchronization signal, and outputs the signal to PB control circuit 26.

When none of the IEDs receives the timing signal from GPS receiver 8, an IED having the lowest priority of the time synchronization signal is desirably configured as follows, in order to ensure a time synchronization signal to be output onto the process bus. That is, the IED having the lowest priority generates, on the condition that it does not receive the time synchronization signal even after a lapse of a set time, the SV data reading timing signal based on an internal clock and outputs the signal to PB control circuit 26, and outputs a time synchronization signal based on the internal clock to the process bus. The set time in this case is set to be equal to or longer than a time required for switching of the time synchronization signal in the case in which the signal from GPS receiver 8 is received by any of the IEDs. Specifically, the set time is set to between several seconds and several tens of seconds.

The above-described set time may be set for each IED. In this case, the shortest set time is set for an IED having the lowest priority, and the set time is increased in ascending order of the priority, so that the internal clock of an IED having a lower priority takes priority. The reason that the internal clock of an IED having a lower priority takes priority when the timing signal from the GPS receiver cannot be received is so that the time synchronization signal will be automatically switched when it becomes possible for an IED having a higher priority to receive the time synchronization signal from GPS receiver 8.

The above-described function of protection and control calculation unit 27 can be implemented by a CPU. Communication control circuit 20, time reception circuit 21, time synchronization control circuit 23, time transmission circuit 25, and PB control circuit 26 can be configured using an FPGA. The function of PB control circuit 26 may be implemented by a CPU along with protection and control calculation unit 27.

[Operation of Time Synchronization Control Circuit]

FIG. 5 is a diagram showing in table form the operation of time synchronization control circuit 23 shown in FIG. 4. Referring to FIG. 5, the operation of time synchronization control circuit 23 is classified by a condition of whether or not a time synchronization signal (A) set to have a higher priority than that of the time synchronization signal from its own IED is received from process bus 6, and a condition of whether or not a timing signal (B) from GPS signal receiver 8 is received.

That is, in the case in which the time synchronization signal (A) set to have a higher priority than that of the time synchronization signal from its own IED is received, then time synchronization control circuit 23 does not output the time synchronization signal to process bus 6 by serving as a transmission source. Time synchronization control circuit 23 also generates the SV data reading timing signal based on the time synchronization signal (A) set to have a higher priority than that of the time synchronization signal from its own IED. It is noted that in the case in which a plurality of time synchronization signals (A) each set to have a higher priority than that of the time synchronization signal from its own IED are received, then a time synchronization signal (A) having the highest priority takes priority.

In the case in which the time synchronization signal (A) set to have a higher priority than that of the time synchronization signal from its own IED is not received, but the timing signal (B) from GPS signal receiver 8 is normally received, then time synchronization control circuit 23 outputs, to process bus 6, the time synchronization signal synchronized with the timing signal (B) received from GPS signal receiver 8. Time synchronization control circuit 23 also generates the SV data reading timing signal based on the timing signal (B) received from GPS signal receiver 8.

Next, the case in which the time synchronization signal (A) having a higher priority than that of the time synchronization signal from its own IED is not received, and the timing signal (B) from GPS signal receiver 8 is not normally received is described. In this case, time synchronization control circuit 23 does not output the time synchronization signal to process bus 6. Time synchronization control circuit 23 necessarily receives a time synchronization signal (D) having a lower priority than that of the time synchronization signal from its own IED from process bus 6, and therefore, reads the SV data at timing synchronized with this received time synchronization signal (D). As described above, when none of the IEDs receives the timing signal from GPS receiver 8, an IED having the lowest priority of the time synchronization signal will output the time synchronization signal based on the internal clock onto the process bus, in order to ensure a time synchronization signal to be output onto the process bus.

Clock generation circuit 24 desirably corrects, while normally receiving the timing signal (B) from GPS signal receiver 8, a clock signal generated based on this timing signal (B).

[As to Time Synchronization Signal]

As an example of the above-described time synchronization signal, a time synchronization signal in accordance with the IEEE 1588 standard specification (IEEE Standard for a Precision Clock Synchronization Protocol for Networked Measurement and Control Systems) (NPD 2) can be used. However, since there is not existing signal indicating the priority of a time synchronization signal in IEEE 1588, information about the priority can be set, for example, by borrowing the place of the clockClass described at 7.6.2.4 on pages 54 to 55 of this standard specification. Specifically, the information about the priority can be put in clockClass=68 to 122 because alternate PTP profiles are assigned to this clockClass (or another appropriate place may be utilized).

Alternatively, the priority of a time synchronization signal may be decided using address information about a transmission source. Specifically, the IEEE 1588 standard specification describes at 7.3.5 on page 44 address information about a transmission source of a time synchronization signal as "Message sourcePortIdentity." In addition, a place where the "Message sourcePortIdentity" is stored in a header is described in Table 18 on page 124 of this standard specification. Each of the IEDs determines, based on address information about a transmission source of a received time synchronization signal, whether or not the received time synchronization signal has a higher priority than that of the IED.

When the priority of a time synchronization signal is determined based on address information in this manner, information about the priority does not need to be added to the time synchronization signal. Priority storage circuit 22 in FIG. 4 stores correspondence between the address information about each IED and the priority. Preferably, by setting the address of each IED in the order of priority or an order reversed from this order, priority storage circuit 22 in FIG. 4 can store only the address information about its own IED.

[Specific Example of Operation of Protection System]

Figure 6:
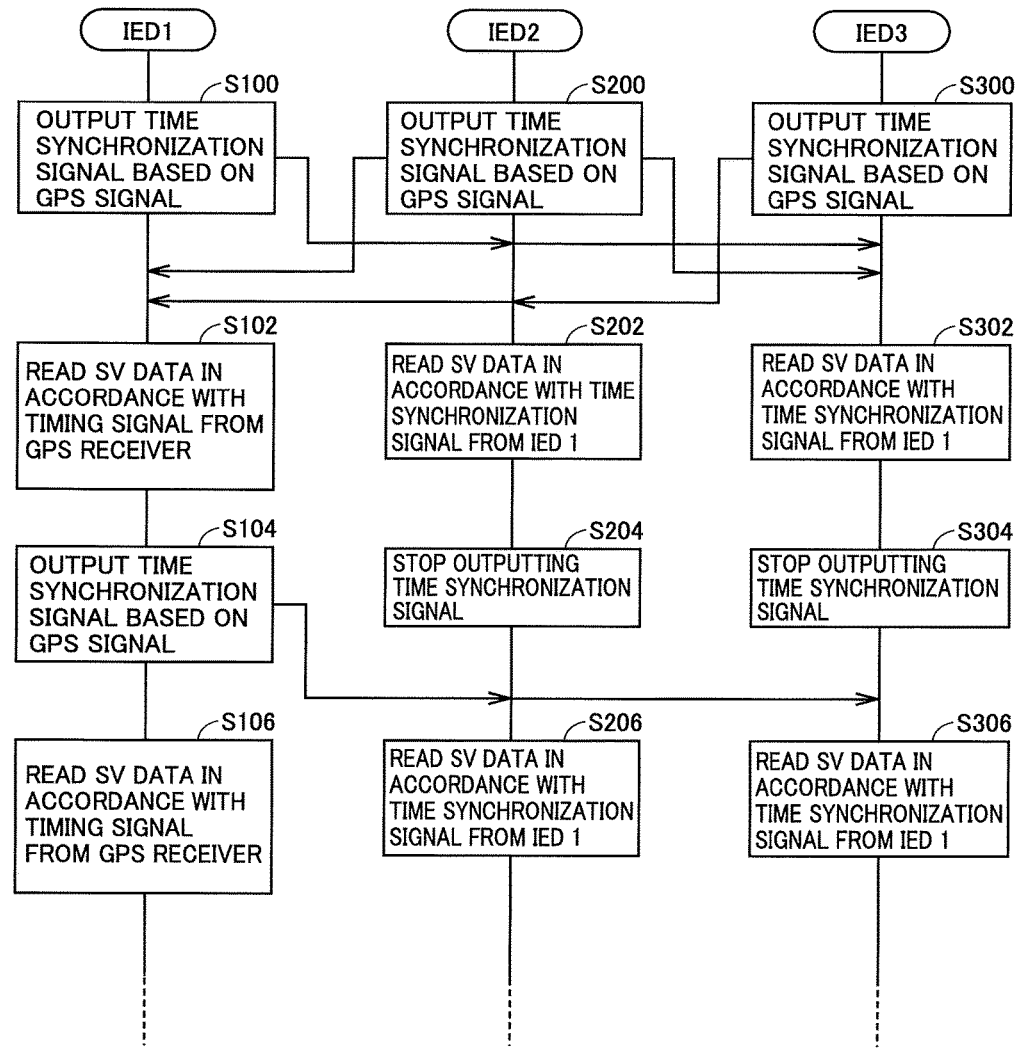
FIG. 6 is a flowchart showing a specific example of operation of the protection system shown in FIG. 1.

FIG. 6 is a flowchart showing a specific example of operation of the protection system shown in FIG. 1. In FIG. 1, it is assumed that the priority of the time synchronization signals has been set in the order of IED 1, IED 2 and IED 3 (the priority of the time synchronization signal from IED 1 being the highest).

Referring to FIGS. 1 and 6, first, IED 1, IED 2 and IED 3 simultaneously transmit time synchronization signals synchronized with the timing signal from GPS signal receiver 8 (steps S100, S200 and S300). Information indicating the priority or identification information about the IED serving as a transmission source is added to each of the transmitted time synchronization signals. Each time synchronization signal is received by the other IEDs.

Since the time synchronization signal received from each of IED 2 and IED 3 has a lower priority than that of the time synchronization signal from IED 1, IED 1 reads the SV data at timing synchronized with the timing signal from the GPS signal receiver (step S102). Since the time synchronization signal received from IED 1 has the highest priority, each of IED 2 and IED 3 reads the SV data at timing synchronized with the time synchronization signal from IED 1 (steps S202 and S302).

In addition, IED 1 outputs the time synchronization signal synchronized with the timing signal from the GPS signal receiver to process bus 6A, by serving as a transmission source (step S104). On the other hand, each of IED 2 and IED 3 stops outputting the time synchronization signal to process bus 6A (steps S204 and S304). Subsequently, the procedure of steps S102, S104, S202, S204, S302 and S304 is repeated.

In this manner, the information about the priority (or the information indicating the address of the IED serving as a transmission source) is added to the time synchronization signal that is output from each IED to each MU for sampling synchronization. Then, when each of the IEDs receives a time synchronization signal having a higher priority than that of the time synchronization signal from the IED, the IED stops outputting the time synchronization signal. As a result, as long as any of the IEDs receives the timing signal from the GPS receiver, only the time synchronization signal from the IED set to have the highest priority of the time synchronization signal is transmitted onto the process bus, and the time synchronization signals from the plurality of IEDs are not simultaneously transmitted, thereby not increasing communication traffic. Moreover, each of the MUs does not receive the time synchronization signals from the plurality of IEDs, and thus has the advantage of avoiding an incorrect selection of a time synchronization signal.

Figure 7:
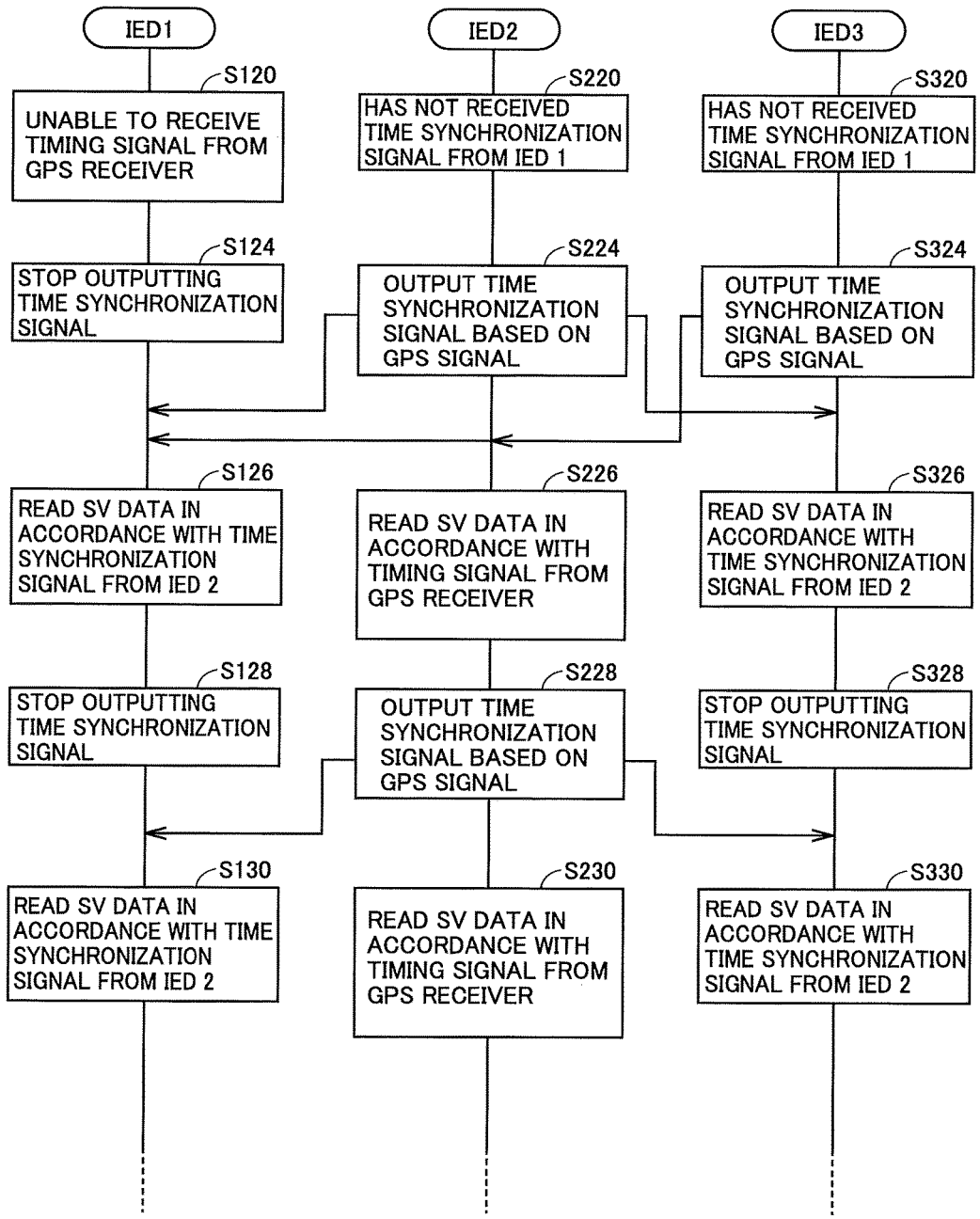
FIG. 7 is a flowchart showing the case in which an IED 1 can no longer normally receive a timing signal from a GPS receiver, in the operation example of FIG. 6.

FIG. 7 is a flowchart showing the case in which IED 1 can no longer normally receive the timing signal from the GPS receiver, in the operation example of FIG. 6.

Referring to FIGS. 1 and 7, when IED 1 having the highest priority of the time synchronization signal can no longer normally receive the timing signal from the GPS receiver (step S120), each of IED 2 and IED 3 no longer receives the time synchronization signal from process bus 6A (steps S220 and S330). Accordingly, each of IED 2 and IED 3 outputs the time synchronization signal synchronized with the timing signal from the GPS signal receiver to process bus 6A, by serving as a transmission source (steps S224 and S324). It is noted that when IED 1 cannot receive the timing signal from the GPS receiver, IED 1 stops outputting the time synchronization signal to process bus 6A (step S124).

At the next timing, IED 1 receives the time synchronization signals from IED 2 and IED 3 that have been input through process bus 6A, and thus reads the SV data in accordance with the time synchronization signal from IED 2, which is a time synchronization signal having a higher priority (step S126). It is noted that when IED 1 cannot receive the timing signal from the GPS receiver, IED 1 does not output the time synchronization signal to process bus 6A (step S128).

Since the time synchronization signal from IED 2 has a higher priority than that of the time synchronization signal from IED 3 that has been input through process bus 6A, IED 2 reads the SV data at timing synchronized with the timing signal from the GPS signal receiver (step S226). In addition, IED 2 outputs the time synchronization signal synchronized with the timing signal from the GPS signal receiver to process bus 6A, by serving as a transmission source (step S228).

Since the time synchronization signal from IED 3 has a lower priority than that of the time synchronization signal from IED 2 that has been input through process bus 6A, IED 3 reads the SV data at timing synchronized with the time synchronization signal from IED 2 (step S326). In addition, IED 3 stops outputting the time synchronization signal to process bus 6A (step S328). Subsequently, the procedure of steps S126, S128, S226, S228, S326 and S328 is repeated.

In this manner, when the time synchronization signal from an IED having a higher priority is lost, the time synchronization signal from an IED having the next highest priority is automatically transmitted onto the process bus. Each IED is configured to read the SV data in accordance with this time synchronization signal having the next highest priority transmitted on the process bus. Accordingly, only the time synchronization signal from one IED is transmitted on the process bus, thereby reducing the effect on traffic on the transmission path.

[Effects]

As described above, in the protection system according to the first embodiment, the plurality of IEDs and the plurality of MUs are interconnected via the process bus. The priority is set for the time synchronization signal that can be issued by each of the IEDs for sampling synchronization. Each of the IEDs is configured, upon receiving the time synchronization signal having a higher priority than that of the time synchronization signal from the IED through the process bus, to stop outputting the time synchronization signal to the process bus. Accordingly, the time synchronization signal will be transmitted from an IED set to have the highest priority of the time synchronization signal to each MU through the process bus. In this case, if the time synchronization signal from the IED set to have the highest priority of the time synchronization signal is lost, then the time synchronization signal will automatically be output to the process bus from the IED set to have the highest priority of the time synchronization signal among the remaining IEDs.

As a result, only the time synchronization signal from one IED is output to the process bus, thereby not creating issues of communication traffic capacity. In addition, since only one time synchronization signal is input to each MU, each MU does not need to have the function of selecting a time synchronization signal.

<Second Embodiment>

In the first embodiment, the priority of the time synchronization signal is set for each IED, and the information indicating the priority of the time synchronization signal (or the identification information about the IED serving as a transmission source) is added to the time synchronization signal to be transmitted. In addition, each of the IEDs is configured, upon receiving the time synchronization signal having a higher priority than that of the time synchronization signal from the IED, to stop outputting the time synchronization signal to the process bus.

In a second embodiment, information indicating whether or not the time synchronization signal is a highly accurate time synchronization signal synchronized with the timing signal received from the GPS signal receiver is added to the time synchronization signal to be transmitted. Then, even if the time synchronization signal is from an IED set to have the highest priority, when the time synchronization signal output is not in synchronization with the timing signal from the GPS signal receiver and is low in accuracy, then switching is made to a time synchronization signal from an IED set to have the next highest priority of the time synchronization signal. A specific description will be given below with reference to the drawings.

[Configuration of Protection System]

Figure 8:
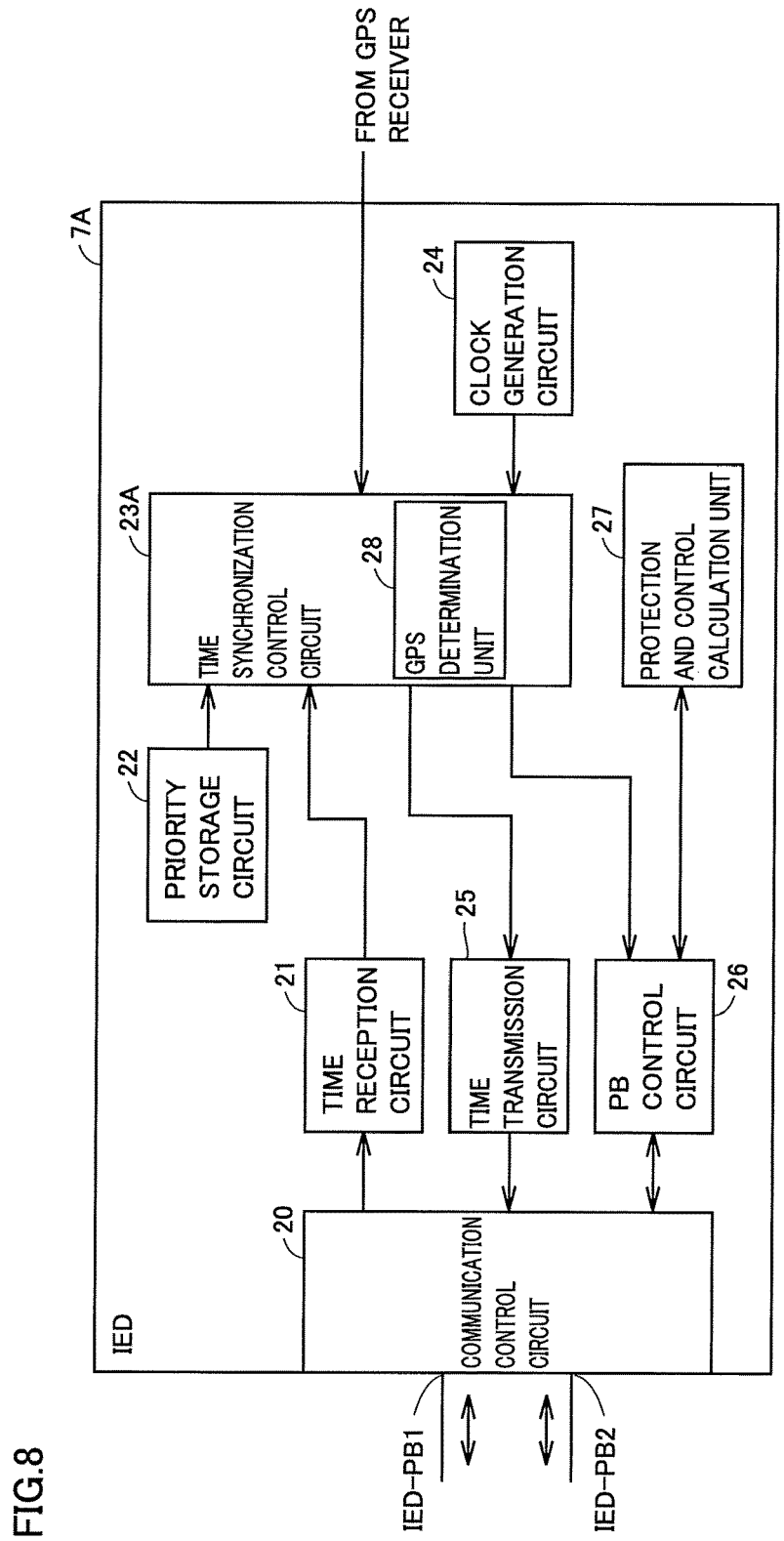
FIG. 8 is a block diagram showing the configuration of an IED 7A in a protection system according to a second embodiment.

FIG. 8 is a block diagram showing the configuration of an IED 7A in a protection system according to the second embodiment. In IED 7A shown in FIG. 8, a time synchronization control circuit 23A is different from time synchronization control circuit 23 of IED 7 shown in FIG. 4 in that it includes a GPS determination unit 28 that determines the accuracy of a time synchronization signal. Since FIG. 8 is otherwise similar to FIG. 4, the same reference characters are allotted to the same or corresponding parts and the description will not be repeated.

[Operation of Protection System]

FIG. 9 is a diagram showing in table form the operation of time synchronization control circuit 23A shown in FIG. 8. Referring to FIGS. 8 and 9, similarly to the first embodiment, time synchronization control circuit 23A of each IED receives the time synchronization signals from the other IEDs received through time reception circuit 21, the timing signal from GPS signal receiver 8, and the clock signal from clock generation circuit 24. It is noted that, in addition to the information indicating the priority of the time synchronization signal (or the identification information about the IED serving as a transmission source), information indicating whether or not the timing signal is normally received from the GPS signal receiver (GPS normal reception flag) is added to each time synchronization signal.

The priority of time synchronization signals are in the order of (1) to (5) below. It is noted that in the cases of (1), (3) and (4) below, time synchronization control circuit 23A does not output the time synchronization signal from its own IED to process bus 6.

(1) The case in which the time synchronization signal received from the process bus has a higher priority than that of the time synchronization signal from its own IED, and the GPS normal reception flag added to that received time synchronization signal has been enabled (if a plurality of time synchronization signals are received, one of them that is set to have the highest priority of the time synchronization signal takes priority).

(2) The case in which the timing signal from the GPS signal receiver is normally received, and the time synchronization signal is in synchronization with this timing signal.

(3) The case in which a time synchronization signal received from the process bus has a higher priority than that of a time synchronization signal from its own IED, but the GPS normal reception flag added to that time synchronization signal has been disabled.

(4) The case in which the time synchronization signal received from the process bus has a lower priority than that of the time synchronization signal from its own IED, but the GPS normal reception flag added to that received time synchronization signal has been enabled (if a plurality of time synchronization signals are received, one of them that is set to have the highest priority of the time synchronization signal takes priority).

(5) The case in which the time synchronization signal has been generated based on the internal clock.

Specifically, as shown in FIG. 9, in the case in which a time synchronization signal (A1) directly based on the GPS signal (that is, the GPS normal reception flag has been enabled) is received from an IED having a higher priority of the time synchronization signal than that of a time synchronization signal from its own IED, then time synchronization control circuit 23A does not output the time synchronization signal to process bus 6A. In addition, time synchronization control circuit 23A generates the SV data reading timing signal at timing synchronized with the received time synchronization signal (A1).

In the case in which the time synchronization signal (A1) directly based on the GPS signal (that is, the GPS normal reception flag has been enabled) is not received from any of the IEDs each set to have a higher priority of the time synchronization signal than that of a time synchronization signal from its own IED, but the timing signal (B) from GPS signal receiver 8 is normally received by time synchronization control circuit 23A, then time synchronization control circuit 23A outputs the time synchronization signal synchronized with the received timing signal (B) to process bus 6A. In addition, time synchronization control circuit 23A generates the SV data reading timing signal such that it is synchronized with the timing signal (B) received from GPS signal receiver 8.

In the case in which a time synchronization signal (A2) not directly based on the GPS signal (that is, the GPS normal reception flag has been disabled) is received from all IEDs each set to have a higher priority of the time synchronization signal than that of a time synchronization signal from its own IED, but the timing signal (B) from GPS signal receiver 8 is not received by time synchronization control circuit 23A, then the operation varies depending on whether or not the time synchronization signal based on the GPS signal is received from an IED set to have a lower priority of the time synchronization signal. First, if the time synchronization signal based on the GPS signal is not received from any of the IEDs having a lower priority of the time synchronization signal, then time synchronization control circuit 23A does not output the time synchronization signal to process bus 6A. In addition, time synchronization control circuit 23A generates the SV data reading timing signal at timing synchronized with the received time synchronization signal (A2) (if there are a plurality of IEDs each set to have a higher priority of the time synchronization signal, one of them that is set to have the highest priority takes priority). On the other hand, if the time synchronization signal (D) based on the GPS signal is received from an IED set to have a lower priority of the time synchronization signal, then time synchronization control circuit 23A generates the SV data reading timing signal at timing synchronized with the received time synchronization signal (D) (if a plurality of time synchronization signals (D) each having a lower priority based on the GPS signal are received, one of them that is set to have the highest priority takes priority). It is noted that, also in this case, time synchronization control circuit 23A does not output the time synchronization signal to process bus 6A.

In the case in which time synchronization signals (A1 and A2) are not received from any of the IEDs each set to have a higher priority of the time synchronization signal than that of a time synchronization signal from its own IED, and the timing signal (B) from GPS signal receiver 8 is not received by time synchronization control circuit 23A, but the time synchronization signal (D) directly based on the GPS signal is received from an IED having a lower priority of the time synchronization signal than that of a time synchronization signal from its own IED, then time synchronization control circuit 23A does not output the time synchronization signal to process bus 6A. In addition, time synchronization control circuit 23A generates the SV data reading timing signal at timing synchronized with the received time synchronization signal (D) (if there are a plurality of IEDs each set to have a lower priority of the time synchronization signal, one of them that is set to have the highest priority takes priority).

In the case in which the time synchronization signals (A1 and A2) are not received from any of the IEDs each set to have a higher priority of the time synchronization signal than that of a time synchronization signal from its own IED, the timing signal (B) from GPS signal receiver 8 is not received, and the time synchronization signal (D) directly based on the GPS signal is not received from any of the IEDs each set to have a lower priority of the time synchronization signal than that of a time synchronization signal from its own IED, then time synchronization control circuit 23 generates a time synchronization signal (C) based on the internal clock and outputs the signal to process bus 6A. In addition, time synchronization control circuit 23A generates the SV data reading timing signal at timing synchronized with the generated time synchronization signal (C).

As described above, even if the time synchronization signal received through the process bus has a higher priority than that of the time synchronization signal from its own IED, when that received time synchronization signal has not been received from the GPS signal receiver, then switching is automatically made to the time synchronization signal from an IED having the next highest priority of the time synchronization signal, which is in synchronization with the timing signal from the GPS signal receiver. As a result, a highly accurate time synchronization signal is advantageously output to the process bus.

[As to Time Synchronization Signal]

As an example of the above-described time synchronization signal, a time synchronization signal in accordance with the IEEE 1588 standard specification (NPD 2) can be used.

Specifically, according to section 7.6.2.6 and Table 7 on pages 56 to 57 of the IEEE 1588 standard specification, a time synchronization signal includes information (time-Source) indicating based on which signal the time is based. Value=20 (GPS) holds if it is based on a GPS signal, whereas Value=A0 (INTERNAL_OSCILLATOR) holds for the internal clock. Therefore, by using this value, it can be determined whether or not the time synchronization signal is directly based on the GPS signal. This is an effective method for a system where all IEDs are connected to a single GPS signal receiver.

As another method, according to section 7.6.2.5 and Table 6 on pages 55 to 56 of the IEEE 1588 standard specification, it can be determined whether or not a time synchronization signal is based on a GPS signal by using information (clockAccuracy) about the accuracy included in the time synchronization signal. In this case, when the value of clockAccuracy is 24 or higher (which corresponds to the case in which the precision error exceeds 1 µs), this means that the time synchronization signal is out of synchronization with the GPS. In view of the accuracy required as a protective relay, when Value=27 or higher (Value=27 corresponds to the case in which the precision error is 100 µs) holds, it is reasonable to determine that the time synchronization signal is not based on the GPS signal. Since all values are the same in a system where all IEDs are connected to a single GPS signal receiver, this method is effective when each IED receives a time synchronization signal individually from a plurality of GPS receivers.

[Specific Example of Operation of Protection System]

FIG. 10 is a flowchart showing an operation example of the case in which IED 1 can no longer receive the GPS signal, in the operation example of FIG. 6.

Referring to FIGS. 1 and 10, when IED 1 set to have the highest priority of the time synchronization signal can no longer receive the timing signal from GPS signal receiver 8, IED 1 outputs the time synchronization signal based on the internal clock (step S140). In this case, each of IED 2 and IED 3 outputs the time synchronization signal synchronized with the timing signal from GPS signal receiver 8 to process bus 6A (steps S244 and S344).

Since the time synchronization signal from IED 2 that has been input through process bus 6A has a lower priority than that of the time synchronization signal from IED 1, but this time synchronization signal from IED 2 is in synchronization with the timing signal from GPS signal receiver 8, IED 1 reads the SV data at timing synchronized with this time synchronization signal from IED 2 (step S146). In this case, IED 1 stops outputting the time synchronization signal to process bus 6A (step S148).

Since the time synchronization signal from IED 1 having a higher priority that has been input through process bus 6A is not in synchronization with the timing signal from GPS signal receiver 8, IED 2 reads the SV data at timing synchronized with the self-received timing signal from the GPS signal receiver (step S246). In addition, IED 2 outputs the time synchronization signal synchronized with the timing signal from the GPS signal receiver to process bus 6A, by serving as a transmission source (step S248).

Since the time synchronization signal from IED 1 that has been input through process bus 6A is not based on the GPS signal, and the time synchronization signal from IED 3 has a lower priority than that of the time synchronization signal from IED 2, IED 3 reads the SV data at timing synchronized with the time synchronization signal from IED 2 (step S346). In addition, IED 3 stops outputting the time synchronization signal to process bus 6A (step S348). Subsequently, the procedure of steps S146, S148, S246, S248, S346 and S348 is repeated.

[Effects]

According to the protection system of the second embodiment, the information indicating the priority of the time synchronization signal from the IED serving as a transmission source of the time synchronization signal, and the information indicating the accuracy of the time synchronization signal (for example, a flag indicating whether or not the timing signal from the GPS signal receiver is normally received) are added to the time synchronization signal. Then, it is determined, based on these pieces of information, whether or not each IED is to output the time synchronization signal. Therefore, according to the second embodiment, it is possible to output a more accurate time synchronization signal to the process bus, in addition to the effects produced in the first embodiment.

It should be understood that the embodiments disclosed herein are illustrative and non-restrictive in every respect. The scope of the present invention is defined by the claims, not by the description above, and is intended to include any modification within the meaning and scope equivalent to the terms of the claims.

REFERENCE SIGNS LIST

1 line; 2 voltage transformer; 3 current transformer; 4 circuit breaker; 5 merging unit; 6, 6A, 6B process bus; 7 IED; 8 GPS signal receiver; 9 hub; 10 analog input circuit; 11 AD converter; 12 CPU; 13, 26 PB control circuit; 14, 20 communication control circuit; 15, 21 time reception circuit; 16, 24 clock generation circuit; 17 sampling control circuit; 18 digital output circuit; 22 priority storage circuit; 23, 23A time synchronization control circuit; 25 time transmission circuit; 27 protection and control calculation unit; 28 GPS determination unit; IED-PB1, IED-PB2, MU-PB1, MU-PB2 input/output port.

The invention claimed is:

1. A process bus-applied protection system comprising:
a process bus;
a plurality of current and voltage sensors, each configured to sample a current and a voltage of a power system at timing synchronized with a time synchronization signal received through the process bus; and
a plurality of IEDs (intelligent electronic devices), each configured to be able to output the time synchronization signal to the process bus by serving as a transmission source,
each one of the IEDs being capable of receiving, through the process bus, the time synchronization signal from another IED serving as a transmission source,
the plurality of IEDs having a predetermined priority,
each one of the IEDs being configured, to:
when the IED does not receive the time synchronization signal from an IED having a higher priority than that of the IED and serving as a transmission source, to output the time synchronization signal to the process bus by serving as a transmission source; and
after the IED outputs the time synchronization signal to the process bus, when the IED receives the time synchronization signal from an IED having a higher priority than that of the IED and serving as a transmission source, stop outputting the time synchronization signal.

2. The process bus-applied protection system according to claim 1, wherein
each one of the IEDs is capable of receiving a timing signal from a corresponding GPS (Global Positioning System) signal receiver, and outputting the time synchronization signal synchronized with the received timing signal to the process bus, and
the time synchronization signal includes information about whether or not the time synchronization signal is a signal synchronized with the timing signal.

3. The process bus-applied protection system according to claim 2, wherein
each one of the IEDs is configured, when the IED receives the time synchronization signal from an IED having a higher priority than that of the IED and serving as a transmission source, and when the received time synchronization signal is not a signal synchronized with the timing signal, to output the time synchronization signal synchronized with the timing signal to the process bus by serving as a transmission source.

4. The process bus-applied protection system according to claim 3, wherein
each one of the IEDs is configured, even if the IED does not receive the time synchronization signal from an IED having a higher priority than that of the IED and serving as a transmission source, when the IED does not receive the timing signal from the corresponding GPS signal receiver, and when the IED receives the time synchronization signal synchronized with the timing signal from another IED serving as a transmission source, not to output the time synchronization signal to the process bus by serving as a transmission source.

5. The process bus-applied protection system according to claim 2, wherein
each one of the IEDs is configured, even if the IED does not receive the time synchronization signal from an IED having a higher priority than that of the IED and serving as a transmission source, when the IED does not receive the timing signal from the corresponding GPS signal receiver, and when the IED receives the time synchronization signal synchronized with the timing signal from another IED serving as a transmission source, not to output the time synchronization signal to the process bus by serving as a transmission source.

6. The process bus-applied protection system according to claim 1, wherein
each one of the IEDs is capable of receiving a timing signal from a corresponding GPS (Global Positioning System) signal receiver, and outputting the time synchronization signal synchronized with the received timing signal to the process bus,
each one of the IEDs is configured, when the IED does not receive the timing signal from the corresponding GPS signal receiver, and when the IED does not receive the time synchronization signal from another IED serving as a transmission source even after a lapse of a set time, to generate a time synchronization signal based on an internal clock, and output the generated time synchronization signal to the process bus by serving as a transmission source, and
the set time is arranged to decrease in descending order of the priority of the IEDs.

7. The process bus-applied protection system according to claim 1, wherein
the time synchronization signal includes information indicating a priority of the IED serving as a transmission source.

8. The process bus-applied protection system according to claim 1, wherein
the time synchronization signal includes identification information about the IED serving as a transmission source of the time synchronization signal, and
each one of the IEDs is configured to determine, based on the identification information, whether or not the IED serving as a transmission source of the received time synchronization signal has a higher priority than that of the IED.

9. A system comprising:
a current and voltage sensor; and
an IED (intelligent electronic device) connected to the current and voltage sensor via a process bus,
the current and voltage sensor being configured to sample a current and a voltage of a power system at timing synchronized with a time synchronization signal received through the process bus,
the IED being configured to output the time synchronization signal to the process bus by serving as a transmission source,
the process bus being further connected to another device capable of outputting the time synchronization signal to the process bus by serving as a transmission source, the time synchronization signal including information about a priority,
the IED being configured to:
when the IED does not receive the time synchronization signal having a higher priority than that of the time synchronization signal from the IED, to output the time synchronization signal to the process bus by serving as a transmission source; and
after the IED outputs the time synchronization signal to the process bus, when the IED receives the time synchronization signal having a higher priority than that of the time synchronization signal from the IED, stop outputting the time synchronization signal.

* * * * *